United States Patent
Jacomb-Hood (10) Patent No.: US 8,090,336 B2
(45) Date of Patent: Jan. 3, 2012

(54) SELF FOCUSING DISTRIBUTED COMMUNICATIONS ARRAY

(75) Inventor: Anthony W. Jacomb-Hood, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 492 days.

(21) Appl. No.: 12/394,894

(22) Filed: Feb. 27, 2009

(65) Prior Publication Data

US 2010/0222005 A1 Sep. 2, 2010

(51) Int. Cl.
H04B 1/06 (2006.01)
(52) U.S. Cl. .............. 455/273; 455/276.1; 455/427
(58) Field of Classification Search .............. None
See application file for complete search history.

(56) References Cited

U.S. PATENT DOCUMENTS

| | | |
|---|---|---|
| 5,463,656 A | 10/1995 | Polivka et al. |
| 6,056,237 A | 5/2000 | Woodland |
| 6,208,304 B1 | 3/2001 | Strickland |
| 6,400,315 B1 | 6/2002 | Adler et al. |
| 6,606,055 B2 | 8/2003 | Halsema et al. |
| 6,714,163 B2 | 3/2004 | Navarro et al. |
| 6,840,480 B2 | 1/2005 | Carroll |
| 6,844,855 B2 | 1/2005 | Carson |
| 7,023,390 B1 | 4/2006 | Kim et al. |
| 7,035,585 B2 | 4/2006 | Forman et al. |
| 7,250,905 B2 | 7/2007 | Judd |
| 7,274,336 B2 | 9/2007 | Carson |
| 2002/0173305 A1 | 11/2002 | Forman et al. |
| 2009/0103593 A1* | 4/2009 | Bergamo ............. 375/146 |

OTHER PUBLICATIONS

Allard et al., "Radiation Pattern Synthesis for Arrays of Conformal Antennas Mounted on Arbitrarily-Shaped Three-Dimensional Platforms Using Genetic Algorithms", IEEE Transactions on Antennas and Propagation, vol. 51, No. 5, May 2003, pp. 1054-1062.
Werner et al., "A Reciprocity Approach for Calculating Radiation Patterns of Arbitrarily Shaped Microstrip Antennas Mounted on Circularly Cylindrical Platforms", IEEE Transactions on Antennas and Propagation, vol. 51, No. 4, Apr. 2003, pp. 730-738.
S.D. Slobin, "302 Antenna Positioning" DSMS Telecommunications Link Design Handbook, Oct. 7, 2004, pp. 1-22, 810-005, Rev. E.

* cited by examiner

*Primary Examiner* — Long Nguyen
(74) *Attorney, Agent, or Firm* — Bracewell & Giuliani LLP (57) ABSTRACT

A method of processing signals received and transmitted between a satellite and sub-arrays of an antenna array. The satellite emits an analog signal received by the sub-arrays, each sub-array in turn produces a corresponding output. The array's total output is approximated by designating one of the sub-array's output as a reference output, and digitally forming a series of beams that consist of the reference output and permutations of the other sub-array outputs with either no time delay or with a time delay applied. A high power beam from the series is selected for cross correlation with each sub-array output to determine the signal's relative arrival time at each sub-array. Each sub-array output is time delayed based on the signal arrival time at that sub-array. The time delayed outputs are combined to form a high gain beam.

23 Claims, 6 Drawing Sheets

SELF FOCUSING DISTRIBUTED COMMUNICATIONS ARRAY

BACKGROUND

1. Field of Invention

The present disclosure relates generally to a method of receiving and transmitting satellite signals with an antenna array. More specifically, the present disclosure relates to optimizing performance of an antenna array which comprises several spatially distributed sub-arrays.

2. Description of Prior Art

Long distance communications such as communications between satellites and ground based locations, and even aircraft, typically require high gain antennas. High gain antennas may be implemented as an array of low gain antennas where the signals associated with each low gain antenna are coherently combined to provide performance equivalent to a high gain antenna. In order to coherently combine the signals associated with the low gain antennas these signals must be appropriately aligned in time relative to each other. For narrow band systems an equivalent phase shift may be used to achieve coherent combination. Each low gain antenna may be implemented as a sub-array of radiating elements with commandable relative phase shift applied to the signal associated with each radiating element so that the sub-array beam may be steered electronically. This implementation is attractive in many applications so the low gain antennas will be referred to as sub-arrays. The low gain antennas could also be implemented as parabolic dishes or other known forms of antennas.

To form the optimal composite receive signal from the sub-arrays, time delays need to be applied to the sub-array outputs to correct for the difference in time that the signal reaches each spatially separate sub-array. Otherwise adding the output signals from the respective sub-arrays will not correctly represent the transmitted by the remote station such as a satellite signal. In particular, time delay needs to be applied to the signal collected from a sub-array which is closer to the signal source to compensate for the extra journey time of the signal reaching a sub-array further from the signal source. The magnitude of the required time delay is calculated by multiplying the distance between the two sub-arrays and the cosine of the angle between a line from the further sub-array to the satellite and a line from the further sub-array to the closer sub-array; the product is then divided by the speed of light. Similarly to form an optimal composite transmit signal from an array of sub-arrays it is necessary to add an appropriate time delay to the signal associated with a sub-array which is closer to the signal receiver.

Generally an antenna's sub-arrays are sufficiently close to each other and their relative location with respect to each other is sufficiently well known that the required relative time delays that need to be applied to each sub-array are easily determined based on the direction to the remote communications station (e.g. satellite) and the relative sub-array locations. In some instances however a sub-array may be separated a sufficient distance from another sub-array so that the precision with which the direction to the remote communications station is known is inadequate to satisfactorily combine the signals. Combining the sub-array outputs with inaccurate time synchronization would not yield a representative satellite signal. Another challenge associated with sub-arrays that are spaced further apart is that their relative positions can dynamically change due to vibrations or bending of the support structure. This also limits the effectiveness of signal combining. When integrating an antenna into an air or ground vehicle, there may be severe constraints placed on the relative locations of the sub-arrays based on the vehicle design. So in some cases the sub-arrays are forced to be so far apart that established methods for setting the relative time delay of each sub-array are inadequate for satisfactory long distance communications. Due to the reciprocal nature of electromagnetic transmissions, the performance of a transmit antenna comprising several transmit sub-arrays is degraded in the same manner as a receive antenna comprising several receive sub-arrays. In some narrow band systems it is satisfactory to implement the time delay correction as a phase correction.

SUMMARY OF INVENTION

Disclosed herein is a method of processing signals received and transmitted between a remote station such as a satellite and sub-arrays of an antenna array. For the case where the antenna array is receiving, the satellite emits an analog signal received by the sub-arrays; each sub-array in turn produces a corresponding output. One of the sub-array's is selected as a reference sub-array and a series of composite output signals is formed by combining the output signal of the reference sub-array with permutations of the other sub-array outputs with either no time delay applied or a time delay applied which is equal to half of a wavelength of the signal frequency divided by the speed of light. For narrow band signals this delay can be equivalent to a 180° phase shift. A high power signal from the series is selected for cross correlation with each sub-array output to determine the signal's relative arrival time at each sub-array. Each sub-array output has a time delay applied to delay the signal to equal the arrival time of the signal collected by the sub-array furthest from the satellite. After the application of these time delays all of the signals from the sub-arrays may added in a time synchronized manner which results in the optimal signal being formed by the antenna. This is equivalent to maximizing the antenna gain in the direction of the satellite.

In an example of use of the method described herein where the antenna array is transmitting, and the relative locations of the transmit sub-arrays and the angle to the satellite are known, time delays may be applied to the signal entering the transmit sub-arrays to form a high gain beam in the direction of the satellite. In applications where the transmit sub-arrays are implemented as part of an integrated transmit and receive sub-array, or where each transmit sub-array is located adjacent to an associated receive sub-array (so that the location of the transmit sub-array relative to its associated receive sub-array is precisely known), time delays calculated for receive operation may be applied to also achieve transmit operation.

In an example of use of the method described herein where the antenna array is transmitting and the relative locations of the transmit sub-arrays are not well known and/or the angle to the satellite is not well known, information content can be uniquely modulated for each transmit sub-array, which emits this modulated signal for transmission to the satellite. For example each transmit sub-array may operate on a different frequency (frequency division multiplexing) or using a different code (code division multiplexing). The satellite receives these signals and rebroadcasts all of them to the ground for processing in a communications receiver. The communications receiver collects all of the signals and removes the unique multiplexing applied to each signal. For example if frequency division multiplexing is used the signals are all frequency translated to a common frequency or if code division multiplexing is used the code is removed from each signal. One of the received signals is selected as a reference signal and a series of composite output signals is formed by combining the reference signal with permutations of the other signals with either no time delay applied or with a time delay applied which is equal to half of a wavelength of the signal frequency divided by the speed of light. For narrow band signals this delay can be equivalent to a 180° phase shift. A high power signal from the series is selected for cross correlation with each received signal to determine the signal's relative arrival time. Each received signal has a time delay applied to delay the signal to equal the arrival time of the signal from the sub-array furthest from the satellite. After the application of these time delays all of the received signals may added in a time synchronized manner which results in the optimal signal being formed. Alternatively the communications receiver may be located in the satellite and this processing may be performed on the satellite.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

Described herein is an example of a communications system and method of using the system; the system and method are usable in satellite communications and other long distance communications. The communications system can include an antenna with antenna sub-arrays, where the sub-arrays can be situated so that when the sub-arrays receive an analog signal, the corresponding output from at least one of the sub-arrays differs in time delay from one or more of the other sub-array outputs. This can be caused by a different spatial location by the sub-array when receiving the signal. An embodiment of the communications system described herein includes a signal processor that adjusts for the time delay difference so that the sub-array outputs can be combined to form a composite signal with improved signal to noise ration. This also creates a high gain beam from the antenna in the direction of the satellite.

Figure 1:
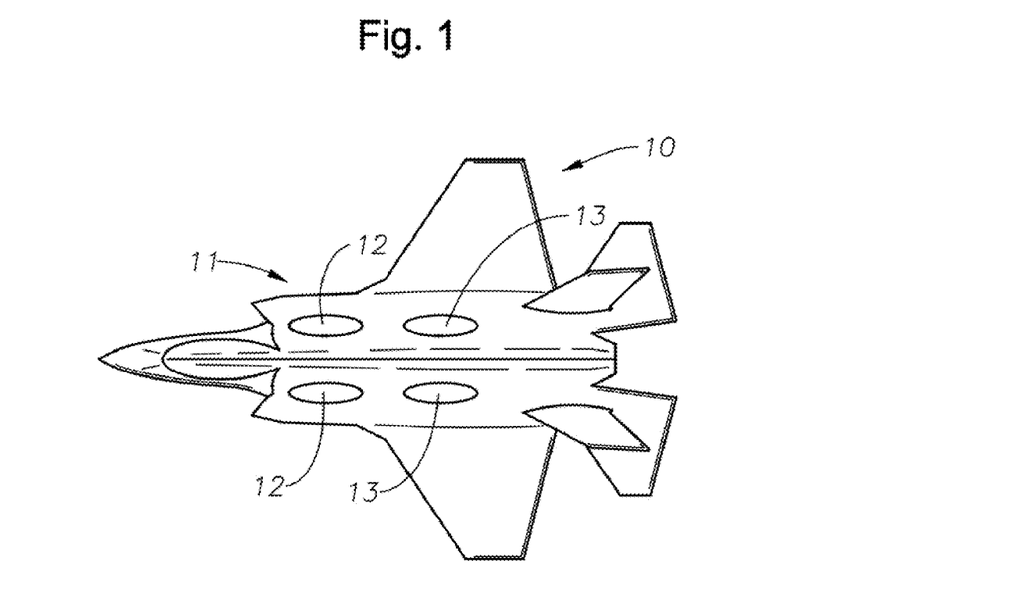
FIG. 1 depicts an aircraft having an antenna with sub-arrays.

An aircraft 10 is depicted in an overhead view in FIG. 1. The aircraft 10 shown is a tactical fighter aircraft, but the device and method disclosed herein is applicable to any type of vehicle, for space, air, or ground use, as well as any device or structure that is generally stationary. An antenna 11 is illustrated provided on the aircraft 10 outer surface on its upper side. In the embodiment shown, the antenna 11 includes a transmitting antenna 12 and a receiving antenna 13. Both the transmitting and receiving antennas 12, 13 include two segments, wherein each segment may have antenna sub-arrays. The transmitting and receiving antennas 12, 13 are not limited to the two segments as shown, but can be a single segment or a multiplicity of segments. The four segments of the antenna 11 of FIG. 1 are shown spaced apart and disposed on the shoulder adjacent the main fuselage and the wings. The communications system described herein however is not limited to the antenna 11 arrangement of FIG. 1, but may be positioned anywhere on the aircraft 10.

Figure 2:
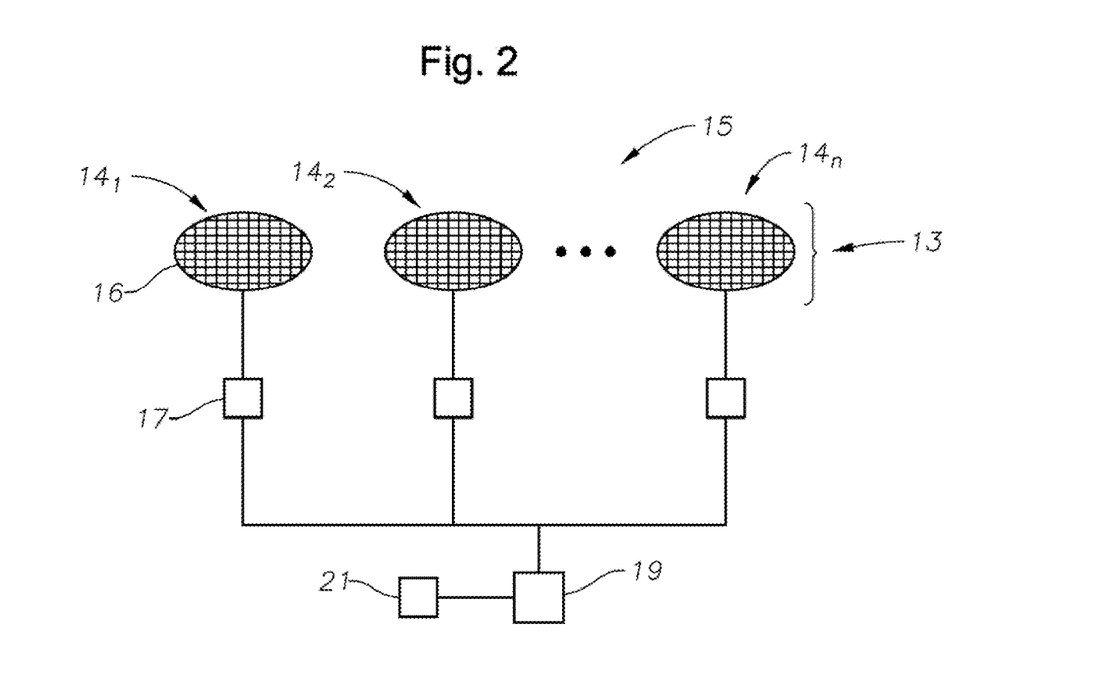
FIG. 2 is a schematic of a receive communications system including an antenna implemented as an array of sub-arrays.

An example of a communications system 15 is schematically illustrated in FIG. 2. In this embodiment the communications system 15 includes an antenna 11 with sub-arrays $14_1$-$14n$; there can be at least two sub-arrays $14_1$-$14n$ and up to n sub-arrays. Each sub-array is capable of forming a beam directed, mechanically or electronically, towards the remote satellite. Aircraft applications typically employ electronic beam pointing since electronically steered sub-arrays can be more conveniently integrated into an air vehicle surface. As shown, the sub-arrays $14_1$-$14n$ include a number of radiating elements 16. The radiating elements 16 may be conducting members, such as wires, patches, or slots, arranged for signal communication. The conducting members can be formed into loops that are helically arranged, rectangularly arranged, or curvilinear. The loops, patches, or slots can be overlaid or in a single layer. The sub-array can include substrate providing a base for the members, the loops or patches can be attached to the substrate or encapsulated therein. For electronically steered sub-arrays, a phase control device can be provided for each radiating element to steer the beam. For receive sub-arrays, a Low Noise Amplifier can be provided at each radiating element, for transmit electronically steered sub-arrays, a power amplifier is typically provided at each radiating element. A transmitter or receiver 17 is shown connecting to each sub-array $14_1$-$14n$ for transmitting or receiving an output beam that represents a signal transmitted or received by the corresponding sub-array $14_1$-$14n$. Optionally, a receiver 17 may connect to one or more sub-arrays $14_1$-$14n$. A processor 19 is depicted in communication with each receiver 17, as will be discussed in more detail below, the processor 19 may be adapted to condition signals, data, information, or other communication received from the receiver 17 or fed to transmitter 17. The system and method disclosed herein is not limited to the sub-array embodiments illustrated, but can include any device or apparatus that can receive and/or transmit a signal, including mechanically steered antennas such as parabolic antennas or arrays of loops, patches or slots with a fixed beamformer.

Figure 3:
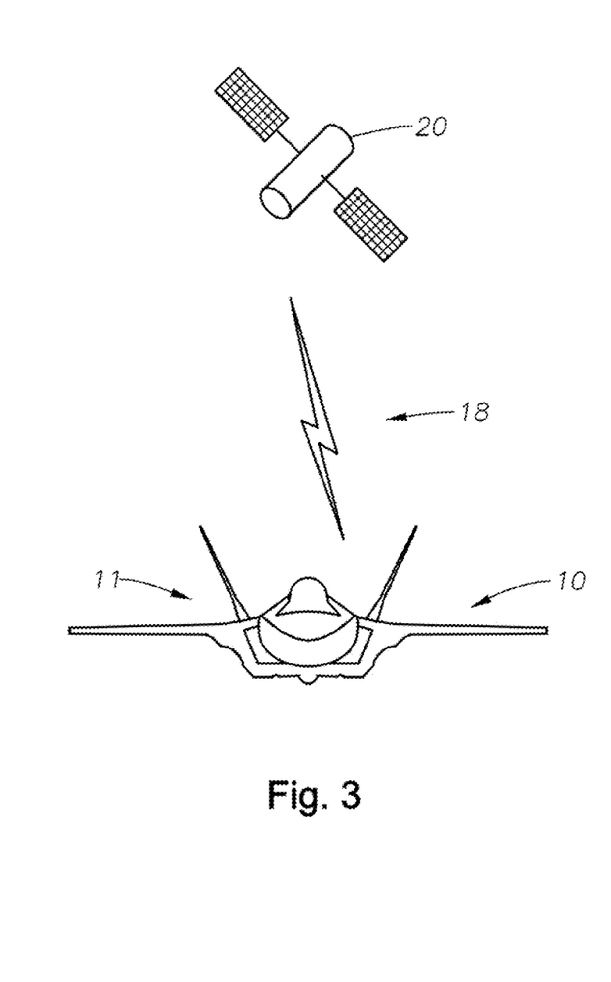
FIGS. 3 and 4 schematically depict signal communications between a satellite and an antenna with sub-arrays.

A schematic example of the aircraft 10 communicating with a remote station such as satellite 20 is provided in FIG. 3. The remote station could also be another air vehicle or a surface vehicle or a fixed ground site. A signal 18 represents communication between the satellite 20 and aircraft 10; the signal 18 can be transmitted from either the satellite 20 or the aircraft 10. The modulation of signal 18 can be analog or digital and include any type of information. In an example, the signal 18 is transmitted from the satellite 20 in analog form and received by the antenna 11 on the aircraft 10.

As noted above, if an antenna includes more than one sub-array, each sub-array may not receive an analog beam at the same time. A method is provided herein for processing sub-array output signals so that a coherent high gain signal is provided that accurately represents the signal transmitted by the satellite. In one example, the method includes steering the sub-array beams towards the satellite. The beamwidth of the sub-array beams may be selected to be greater than the pointing accuracy which can be achieved without feedback from the satellite so that open loop beamsteering may be used to point each sub-array beam towards the satellite. It is desirable that the open loop pointing accuracy of the sub-array beams be less than 25% of the sub-array beam 3 dB beamwidth. This ensures that the peak of each sub-array beam is close to the satellite. The step of orienting towards the satellite 20 can be performed open loop without signal feedback from the satellite 20. The method may include tuning the receivers 17 to the signal 18 frequency or other signal emitted by the satellite, such as a beacon signal.

When receiving a signal from the satellite 20, the method may include forming trial beams where each trial beam includes a combination of the signals collected by all sub-arrays $14_1$-$14n$. This step includes designating one of the sub-arrays' $14_1$-$14n$ output signals as a reference signal. For each of the other n−1 sub-arrays, two versions of their respective output signal are formed. One version has no time delay applied and the other version has a time delay applied. In one example the applied time delay is equal to half of a wavelength of the signal divided by the speed of light. For narrow band signals this delay is equivalent to a 180° phase shift. In this method trial beams are formed by combining the signal from the reference sub-array with both the delayed and undelayed versions of the signal from each of the other sub-arrays. The series of trial beams in this embodiment includes all possible permutations of undelayed and delayed signals for the non-reference sub-array beams; thus if there are n sub-arrays $14_1$-$14n$, then there are $2^{(n-1)}$ permutations. In an example situation having three sub-arrays, assuming the third sub-array output (O3) is chosen as the reference output and time delay outputs (O1$td$, O2$td$) are generated corresponding to the first and second sub-array outputs (O1, O2): possible trial beam permutations include the following: O3+O1+O2; O3+O1$td$+O2$td$; O3+O1$td$+O2; O3+O1+O2$td$. In this embodiment a combination will not include more than one output beam from a particular sub-array, even if the one output beam includes a time delay and the other does not. A high power combined trial output beam is selected. In an example a high power beam is the combined output beam having the highest power but can also include the combined output beam having the second highest power. For moderate and large values of n identifying a combined output beam in this manner can yield an expected gain in the direction of the satellite 20 of about 2.6 dB less than for an ideal composite beam. This provides a sufficiently good signal to noise ratio for the following steps to be performed. The chosen high power beam can then be compared to each of the sub-array output beams to calculate their relative arrival times. One potential method for calculating the relative arrival times is to cross correlate the chosen high power beam signal with the signal from each individual sub-array output. The step of cross correlation can identify the relative arrival times of signal 18 at each sub-array $14_1$-$14n$. The sub-array which receives the signal 18 last may now be identified. This is the sub-array which is furthest from the satellite. For all other sub-arrays $14_1$-$14n$ an appropriate time delay may be added to time align their respective signals with the signal collected by the sub-array furthest from the satellite. For narrow band systems this step of adding a time delay may be approximated as adding a phase shift where the added phase shift is 360° multiplied by the product of the time delay and the speed of light divided by the wavelength of signal 18. The time delayed (or phase shifted) sub-array output signals may now be added together to form a composite output signal which accurately represents the signal broadcast by the satellite. This process is equivalent to forming a high gain composite beam in the direction of the satellite. The processor 19 can be adapted to perform the steps described herein. The processor 19 can be an information handling system with hardware configured to specifically perform these tasks. Optionally, the processor 19 can include readable media having commands and/or instructions for performing these tasks. A processed signal receiver 21 is shown in communication with the processor 19. The processed signal receiver 21 can be a device that converts the process signal into a different form, such as an acoustic signal, visual display, or data.

In an example of improving the robustness of the process described above, especially in the case where wide band signals are being received, coarse time delay corrections may be applied to all of the sub-array outputs prior to the process of creating the series of trial beams. These coarse time delays may be calculated using the best available estimate of the direction to the satellite and the best available estimate of the relative locations of the sub-arrays using the equation provided above that includes cosine of an angle between lines intersecting sub-arrays and a satellite and the speed of light.

The initial formation of a high gain beam in the direction of the satellite as described above may be performed using a beacon signal provided by the satellite 20. This beacon signal may provide a better signal to noise ratio at the aircraft 10 than the desired satellite signal 18. This improved signal to noise ratio may be desirable to provide a signal from the selected trial beam having a signal to noise ratio adequate to perform satisfactory cross correlation. After a high gain beam has been formed in the direction of the satellite 20, the beacon signal can be used to calculate appropriate relative time delays. In an example of use, the receivers 17 may then be tuned to the desired signal 18 and the relative time delays calculated using the beacon signal may be applied to the sub-array outputs to form an initial trial beam with moderately good gain towards the satellite 20. The composite signal formed in this manner may be cross correlated with the sub-array outputs to calculate more accurate relative time delays which may then be used to form a high gain beam towards the satellite.

Figure 4:
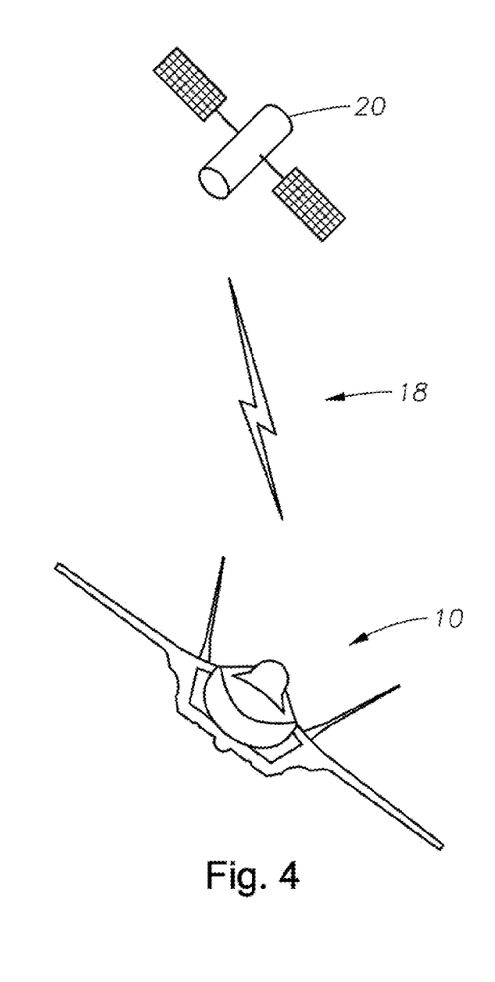

The method may be repeated to account for spatial differences that may occur between the sub-arrays $14_1$-$14n$ over time. These spatial differences may result from aircraft maneuvers, bending or distortion of the airframe and vibrations. Illustrated in FIG. 4 is an example of the aircraft 10 at a changed orientation. If however the method is repeated within a relatively short time period, it can be assumed the sub-arrays $14_1$-$14n$ have changed their location by a relatively small amount as compared to the previous time period. Optimally, the change in the relative arrival times of the signal 18 reaching the sub-arrays is preferably small compared to the reciprocal of the frequency of the signal 18. For example the change in relative arrival times is preferably less than about 10% of the reciprocal of the frequency of signal 18. The time delay settings from the previous time period may be used as a starting point for repeating the method. Steps for creating a high gain beam can begin with cross correlating the composite beam output formed using the previously calculated time delays with each of the sub-array $14_1$-$14n$ outputs. The new relative time delays calculated by this cross correlation can be applied to the sub-arrays and the composite beam may be formed by adding up the appropriately delayed sub-array outputs. In one example, new relative time delay settings may be calculated about once every 100 μs to maintain a high gain beam pointed towards the satellite. Accordingly, repeating the method of digitally forming a high beam signal as described herein, a coherent signal from the sub-arrays $14_1$-$14n$ can be sustained indefinitely. The signal processing required to implement this method may be performed in a digital processor or using an analog processor or using a combination of analog and digital signal processing.

Figure 5:
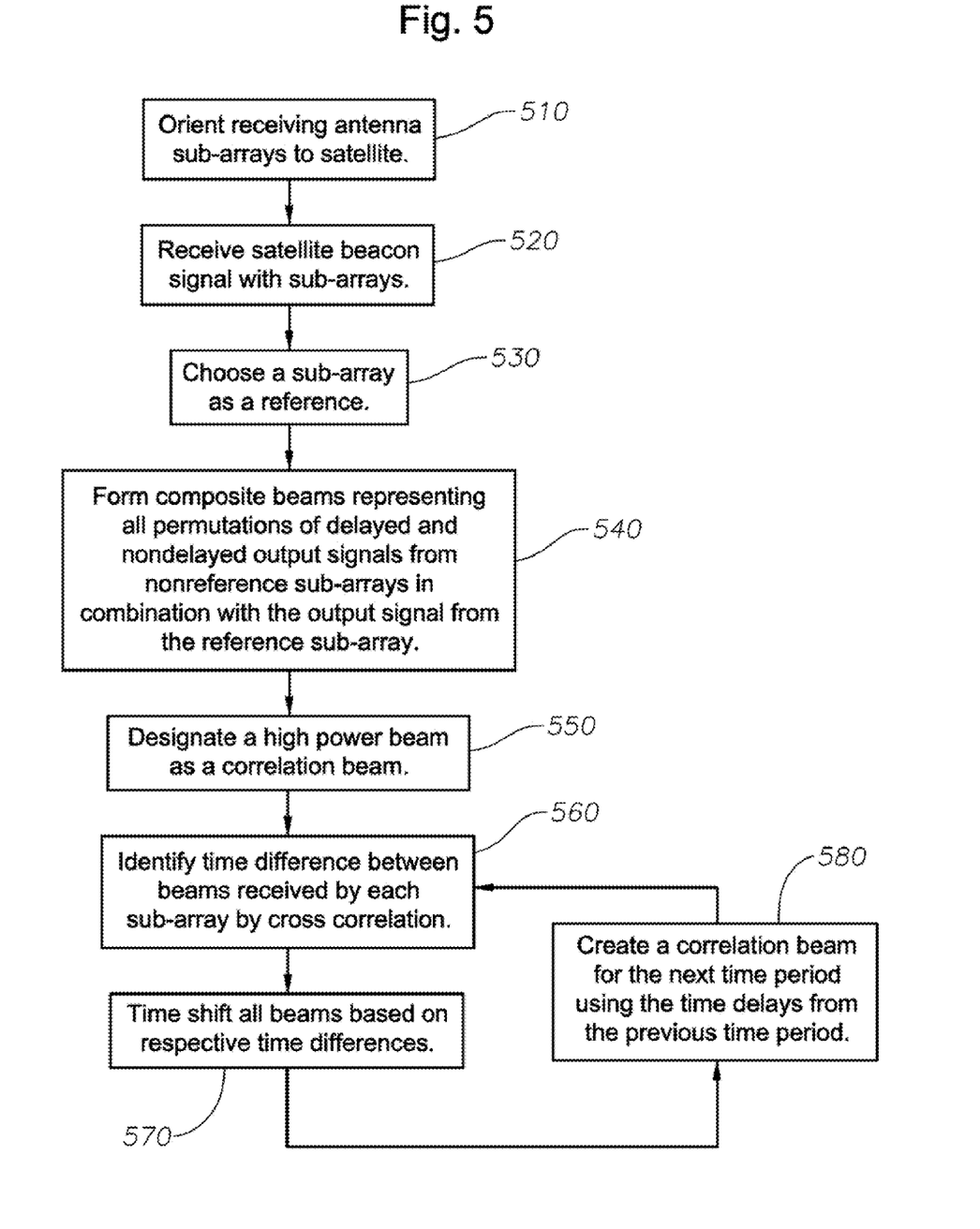
FIG. 5 is a flowchart illustrating a method of receiving signals with antenna having sub-arrays.

An example of a method of communicating with a satellite is described in the flowchart of FIG. 5. In step 510, antenna sub-arrays are oriented towards a satellite to receive a satellite signal. Step 510 may be performed open loop based on knowledge of the satellite's relative location. A satellite signal, such as a beacon signal, is received by the sub-arrays in step 520. Receivers may be included with the sub-arrays for converting the signal received by each sub-array into a more convenient format for processing. This can involve digitizing the received signal, so that the method described in this patent may be implemented using digital signal processing. The method may also be implemented in the analog domain in which case the receiver may convert the received signal to a convenient intermediate frequency. The receivers can be tuned to the beacon signal. A sub-array output signal is chosen as a reference sub-array beam in step 530. In step 540, the reference beam is combined with all possible combinations of non-delayed and delayed versions of the sub-array received signals to create a series of output signals associated with a series of combination antenna beams. The delayed signals are delayed by half of a wavelength of the signal frequency divided by the speed of light. For narrow band signals this delay is equivalent to a 180° phase shift. To illustrate an example, 128 beams ($2^{(8-1)}$) would be produced in step 540 for an antenna having eight sub-arrays. A high power output signal of the series of combination output signals is designated as a correlation reference signal in step 550. The time difference between the correlation reference signal and each sub-array's output signal is determined in step 560. Step 570 includes time shifting the sub-array output signals so that they are time synchronized. This step involves adding sufficient time delay to each sub-array output signal so that it is synchronized with the output signal provided by the sub-array furthest from the satellite. This step corrects for the different journey times from the satellite to the various sub-arrays. When the delayed sub-array output signals are added together, a composite output signal is formed with improved fidelity to the transmitted satellite signal. This process forms a composite antenna beam pointed towards the satellite with high gain.

After a high gain beam is formed at the beacon frequency the receivers may be tuned to the desired signal frequency. The time delays calculated for the beacon frequency may be used to form an initial composite beam at the signal frequency. The resulting composite signal may be cross correlated with the received sub-array signals to calculate optimal time delays for the desired satellite signal. To continuously maintain a high gain beam pointing towards the satellite the relative time delays need to be regularly updated. If the time periods between time delay updates are sufficiently short, the time delays used for the previous period may be used to form an initial composite beam and associated composite antenna output signal for cross correlating with the sub-array output signals (Step 580). To rely on time delays from the previous period, the time period between updates should be sufficiently short so that the change in the relative time delays is smaller than about 10% of the reciprocal of the signal frequency. This is equivalent to looping back to step 560. At least some of the steps of FIG. 5 can be accomplished by use of a processor, in one embodiment steps 520, 530, 540, 550, 560, 570 and 580 are performed with a processor. The processor may be either an analog or digital processor.

Figure 6:
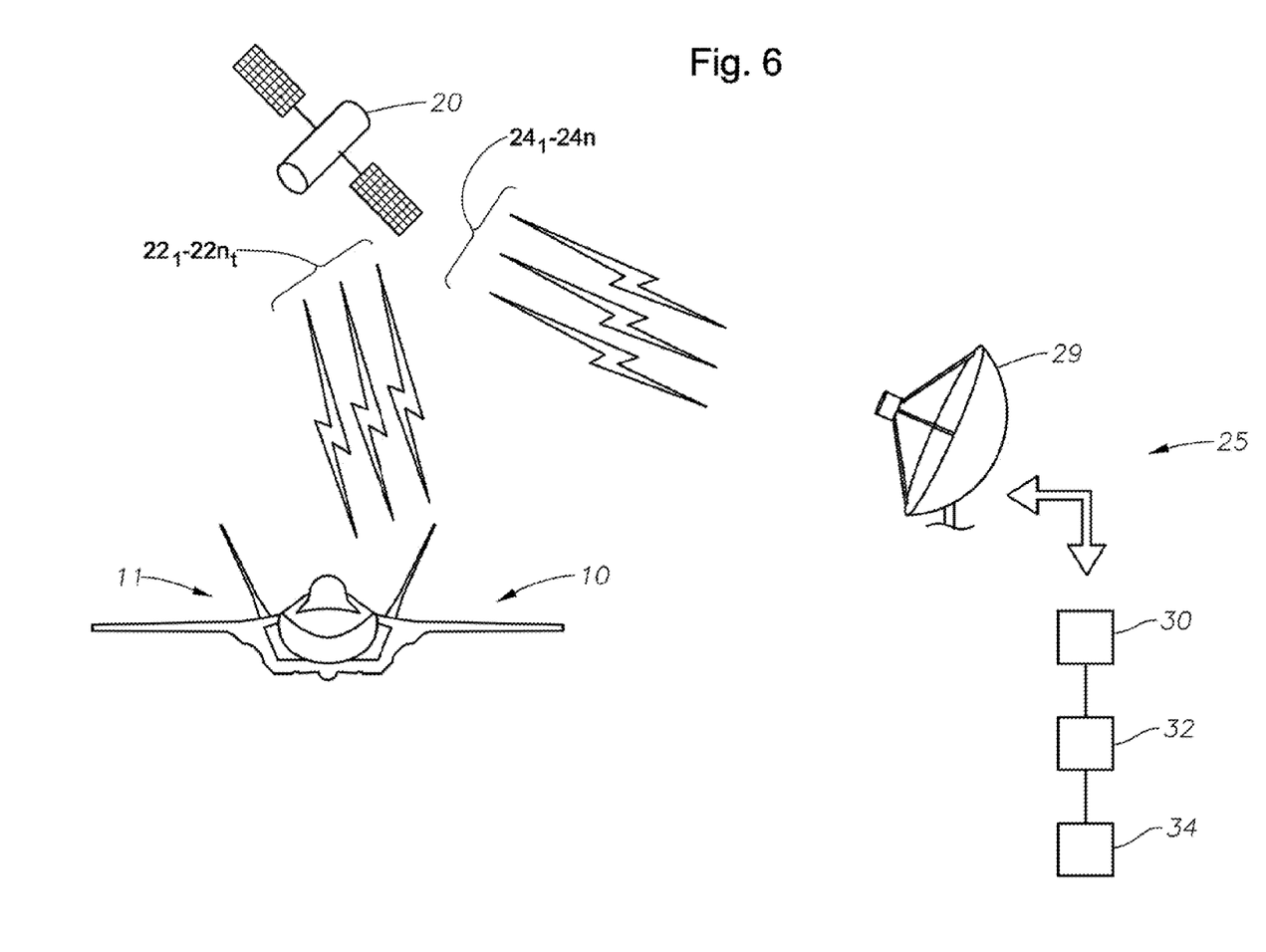
FIG. 6 illustrates a signal transmitted from an antenna having sub-arrays and being transponded by a satellite to a receive communications system.
Figure 7:
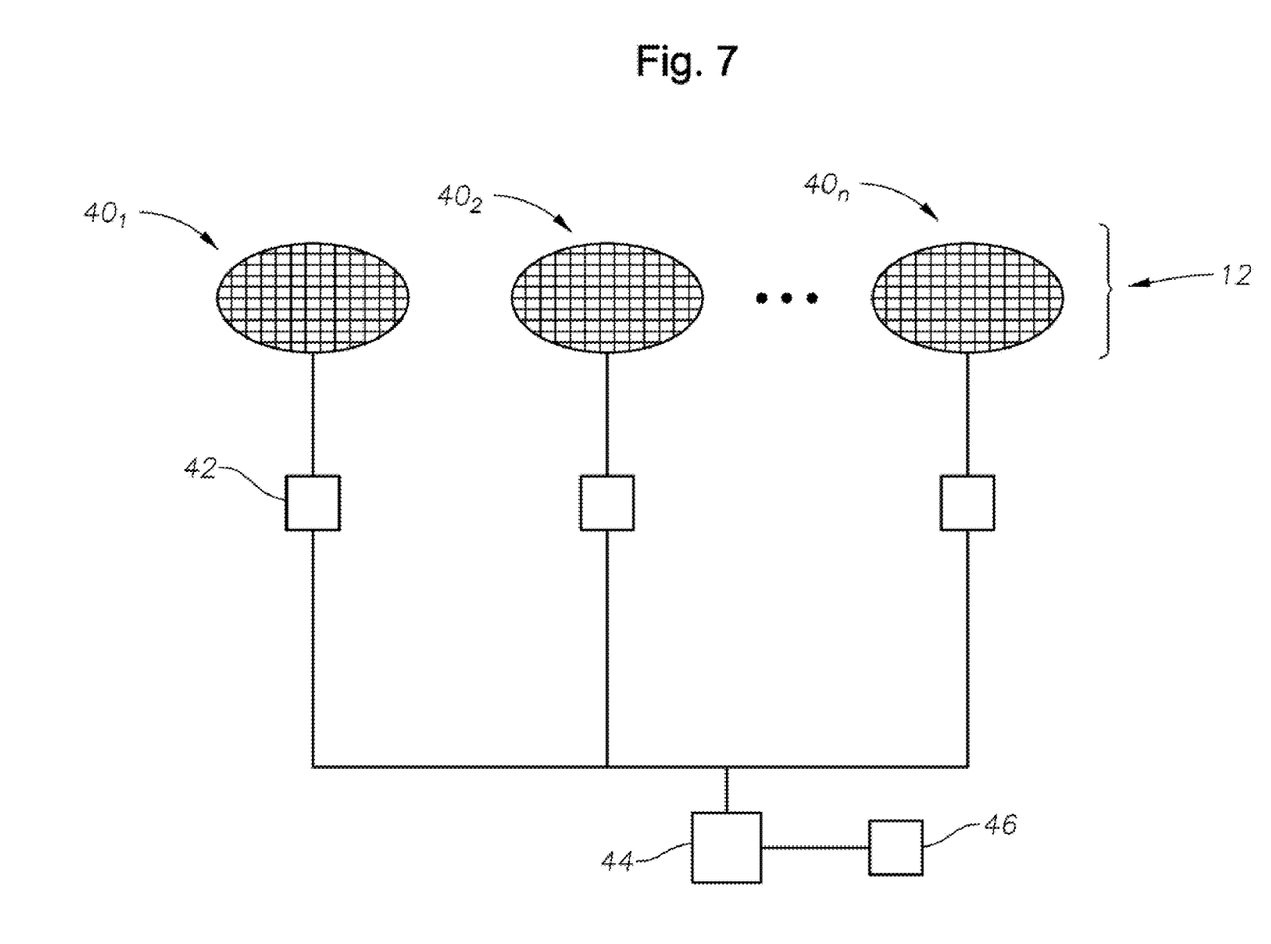
FIG. 7 is a schematic of a transmit communications system including an antenna implemented as an array of sub-arrays.

A method of transmitting a signal is schematically portrayed in FIGS. 6 and 7. The aircraft 10 is shown transmitting n signals $22_1$-$22n$ from its antenna 11 to a satellite 20 that transponds a corresponding n signals 24-24n to a communications receiver system 25. Each signal $22_1$-$22n$ is broadcast by one transmit sub-array 40-40n (FIG. 7). The signal content (e.g. voice, imagery or data) can be identical for signals $22_1$-$22n$. In an embodiment, the signal is input to a signal input device 46, processed and/or converted into a desired transmitting format or protocol in a processor 44, and transmitted from a transmitter 42. However these signals are broadcast in a manner to prevent mutual interference. This may be achieved by using different center frequencies (Frequency Division Multiplexing) or by applying orthogonal codes (Code Division Multiplexing) or by any other known technique. In this example, the transmit sub-arrays point their beams open loop towards the satellite 20.

The communications receiver system 25 receives the n signals from the n transmit sub-arrays using an antenna; which in FIG. 6 is depicted as a parabolic dish 29, however any form of antenna may be used to receive signals $24_1$-$24n$. These n signals can be processed in a manner analogous to the processing of the n sub-array output signals in the aircraft 10 when the aircraft 10 is receiving from the satellite 20. In particular, the communications receiver system 25 calculates the difference in journey times for the n signals and applies corresponding time corrections to allow these signals to be coherently added. Coherently adding the signals forms a composite output signal with improved signal to noise ratio. A receiver 30, processor 32, and processed signal receiver 34 are shown in communication with the dish 29.

The initial formation of a high signal to noise ratio signal as described above may be performed using a beacon signal provided by the aircraft 10. This beacon signal may provide a better signal to noise ratio at the communications receiver 25 than the desired signal. This improved signal to noise ratio may be desirable to provide a signal from the selected trial combination with an adequate signal to noise ratio (SNR) to perform satisfactory cross correlation. After a high SNR beacon signal has been formed using the beacon signal to calculate appropriate relative time delays, the receivers 30 may be tuned to the desired signals $24_1$-$24n$ and the time delays created using the beacon frequency may be applied to the signals to form an initial trial composite signal with good SNR. The composite signal formed in this manner may be cross correlated with the signals $24_1$-$24n$ to calculate more accurate relative time delays which may then be used to form a composite output signal with improved SNR. This process may be continuously repeated to maintain a high SNR communications link as the aircraft 10 moves. For each repeat of the process the trial composite signal for cross correlation is formed using the time offsets from the previous period. In order to improve the robustness of this process coarse time delays may be applied to the signals $22_1$ to $22n$ prior to transmission by the sub-arrays $40_1$ to $40n$. These coarse time delays may be calculated using the best available knowledge on the aircraft of the direction to the satellite and the relative locations of the sub-arrays 40. The coarse time delays may be calculated using the equation above that includes the cosine of an angle between lines intersecting sub-arrays and a satellite and the speed of light.

Causes of differences in journey times are the differences in the distances from the various transmit sub-arrays 40-40n in the aircraft 10 to the satellite 20. Differences in the time taken for the signals $22_1$-$22n$ to be transponded through satellite 20 to form signals $24_1$-$24n$ may also contribute to the difference in journey time. If the system uses Frequency Division Multiplexing to prevent mutual interference between signals $22_1$-$22n$ and also between signals $24_1$-$24n$, atmospheric effects may result in slight differences in the speed of electromagnetic propagation through the atmosphere as a function of frequency. The proposed method corrects for causes of differences in journey time.

Figure 8:
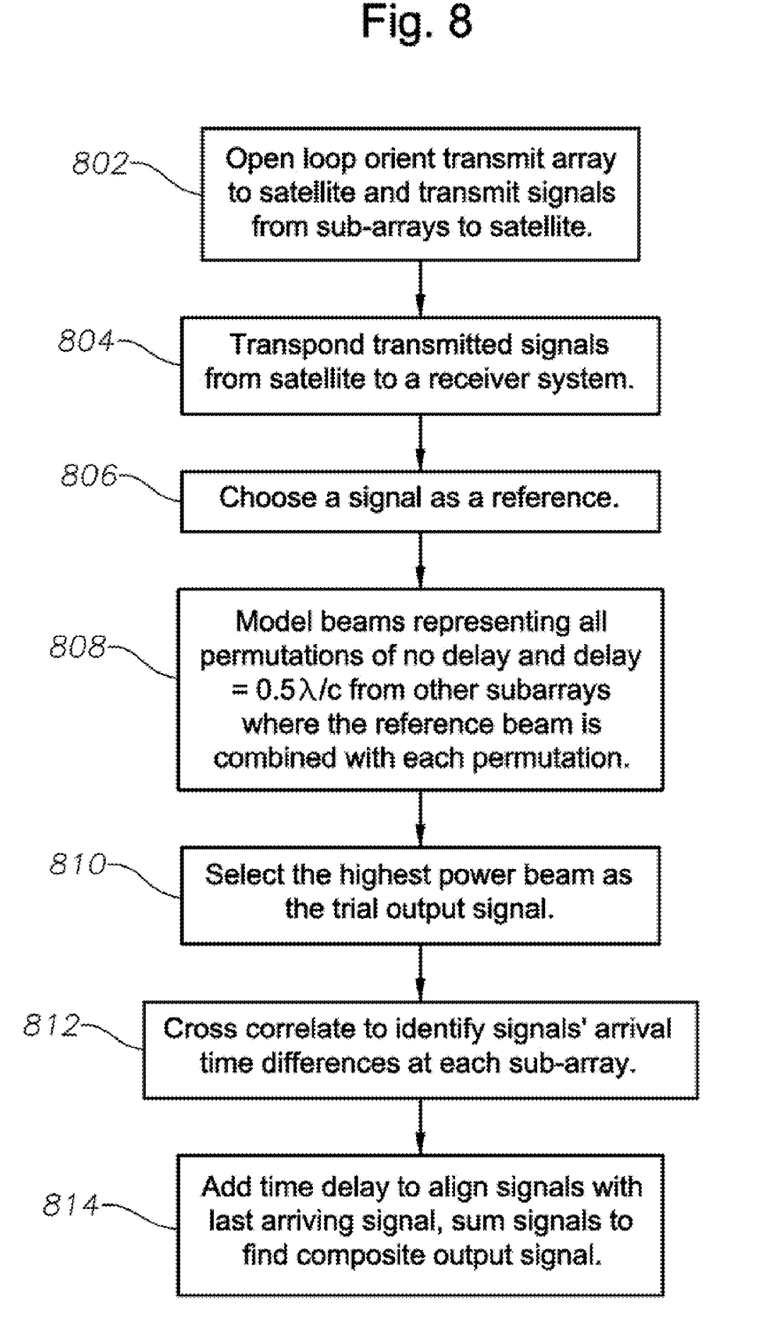
FIG. 8 is a flowchart illustrating a method of transmitting signals with antenna having sub-arrays.

An example of transmitting signals is outlined in a flowchart of FIG. 8. In step 802 a first step in an embodiment of the method includes steering the transmit sub-array beams towards the satellite 20. The beamwidth of the transmit sub-array beams is preferably selected to be greater than the pointing accuracy which can be achieved without feedback from the satellite 20 so that open loop beamsteering may be used to point each transmit sub-array beam towards the satellite 20. It is desirable that the maximum open loop pointing error of the transmit sub-array beams be less than 25% of the sub-array beam 3 dB beamwidth. This ensures the gain of each transmit sub-array beam in the direction towards the satellite is within 0.75 dB of the peak gain of the transmit sub-array beam. The step of orienting towards the satellite 20 can be performed open loop without signal feedback from the satellite 20. After orienting toward the satellite 20, signals $22_1$-$22n$ are transmitted to the satellite 20 from the transmitter sub-arrays $40_1$-$40n$. The signals $22_1$-$22n$ the satellite 20 receives are transponded to the receiver system 25 as signals $24_1$-$24n$ (step 804). In an example, signals $22_1$-$22n$ contain the same information as signals $24_1$-$24n$, but may be frequency translated to avoid interference.

The method may include forming $2^{(n-1)}$ trial combinations where n is the number of transmit sub-arrays 40 and also the number of signals $24_1$-$24n$ received by receiver 25. Each trial combination can include all n received signals. Shown in step 806, the method includes designating one of the received signals $24_1$-$24n$ as a reference signal. Step 808 represents an example of forming an equivalent trial output beam from the received signals $24_1$-$24n$. When the received signals $24_1$-$24n$ are combined, an equivalent output beam is formed rather than a beam in real space. For each of the other n−1 received signals, two versions of the signal may be formed. One version has no time delay applied and the other version has a time delay applied which is equal to half of a wavelength of the signal frequency divided by the speed of light. For narrow band signals this delay is equivalent to a 180° phase shift. The $2^{(n-1)}$ trial combinations can be formed by combining the reference signal with either the delayed or undelayed version of the signal from each of the other sub-arrays. The series of trial combinations can include all possible permutations of undelayed and delayed signals for the non-reference signals. If there are n sub-arrays 40 then there are $2^{(n-1)}$ permutations. A combined trial output signal (equivalent or in real space) having a high power is selected (step 810). For moderate and large values of n, identifying the combined output signal formed in this manner can yield a signal having a magnitude of about 2.6 dB less than a signal formed with an ideal set of time delay offsets. This provides a sufficiently good signal to noise ratio for the following steps to be performed. A high power equivalent combined signal can then be cross correlated to each of the received signals $24_1$-$24n$ (step 812). The step of cross correlation can identify the signals' $24_1$-$24n$ relative arrival times at receiver 25. The signal with the longest journey time (i.e. the last signal to arrive) may now be identified. This signal is likely to originate from the transmit sub-array 40 furthest from the satellite. Illustrated in step 814, for all other received signals $24_1$-$24n$, based on their respective arrival times, appropriate time delays may be added to time align the signals with the signal having the longest journey time. For narrow band systems, this step of adding a time delay may be approximated as adding a phase shift where the added phase shift is 360° multiplied by the product of the time delay and the speed of light divided by the wavelength of signal 24. The time delayed (or phase shifted) received signals $24_1$-$24n$ may now be added together to form a composite output signal with improved signal to noise ratio.

To continuously maintain a composite output signal with improved signal to noise ratio the relative time delays should be regularly updated. If the time periods between time delay updates are sufficiently short, the time delays used for the previous period may be used to form an initial composite beam and associated composite antenna output signal for cross correlating with the sub-array output signals (Step 816). To rely on time delays from the previous period, the time period between updates should be sufficiently short so that the change in the relative time delays is smaller than about 10% of the reciprocal of the signal frequency. This is equivalent to looping back to step 812. At least some of the steps of FIG. 8 can be accomplished by use of a processor, in one embodiment steps 806, 808, 810, 812, 814, and 816 are performed with a processor. The processor may be either an analog or digital processor.

The maximum possible improvement in signal to noise ratio compared to the signal to noise ratio of a single signal 22 coming from a single transmit sub-array 40 is n, where n is the number of transmit sub-arrays 40 on the aircraft 10. In a practical implementation the improvement in signal to noise ratio achieved by this method may be a few tenths of a dB or perhaps a dB less than the ideal maximum. The processor 32 can be adapted to perform the steps described herein. The processor 32 can be an information handling system with hardware configured to specifically perform these tasks. Optionally, the processor 32 can include readable media having commands and/or instructions for performing these tasks. A processed signal receiver 34 is shown in communication with the processor 32. The processed signal receiver 34 can be a device that converts the processed signal into a different form, such as an acoustic signal, visual display, or data.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, an aircraft could have a receive system only, a transmit system only, or both a transmit and receive system. Optionally, sub-arrays may be included that both transmit and receive. In this case the time delay corrections will be the same for both transmit and receive. So it is possible to calculate the time delay corrections on receive and apply them to transmit. This can be advantageous as it means that n FDM frequencies or n CDM codes may not be required, all n sub-arrays could transmit on the same frequency. Also the theoretical maximum improvement in SNR in this case would be $n^2$ instead of n, which is a significant improvement. This improvement may also be achieved if transmit sub-arrays are placed sufficiently close to each receive sub-array with a fixed relative position so that the relative positions of all of the transmit sub-arrays may be accurately inferred from the relative positions of all of the receive sub-arrays. Moreover, sub-arrays as described herein are not limited to placement on an aircraft, but can be included on any vehicle or transportable unit, examples include cars, trucks, jeeps, tanks, personnel carriers (armored and otherwise), water craft, space craft, missiles, trailers, and the like. These and other similar modifications will readily suggest themselves to those skilled in the art, and are intended to be encompassed within the spirit of the present invention disclosed herein and the scope of the appended claims.

What is claimed is:

1. A method of communicating between a remote transmitting station and a receive antenna having at least two sub-arrays, the method comprising:
   a. receiving a signal transmitted by the remote transmitting station with the at least two of the antenna sub-arrays, so that each of the at least two sub-arrays forms an output signal corresponding to the received signal;
   b. designating the output of one of the at least two sub-arrays as a reference output signal;
   c. forming a collection of composite output signals by combining the reference output signal with permutations of output signals from the other of the at least two sub-arrays and their output signals having an added time delay;
   d. selecting a composite output signal from the collection;
   e. calculating time offsets between the selected composite output signal and the at least two sub-array output signals;
   f. selecting the output signal from the sub-array having received the signal last and adding a time adjustment to the output signals associated with other sub-arrays so that the output signals from each sub-array are synchronized; and
   g. combining the time adjusted output signals to create an output signal.

2. The method of claim 1, further comprising cross correlating the selected composite output signal with the at least two sub-array output signals to calculate the time offsets of step (e).

3. The method of claim 1, wherein the composite output signal selected in step (d) is the composite output signal having a high power.

4. The method of claim 1, further comprising steering the at least two sub-arrays towards the remote transmitting station.

5. The method of claim 1, wherein the remote transmitting station is a satellite.

6. The method of claim 1, further comprising maintaining a signal lock by performing steps (e)-(g) within a discrete time period so that the relative distance of the sub-arrays with respect to the remote transmitting station is substantially unchanged, and forming the composite output signal using the relative time delays calculated in step (f) of the prior discrete time period.

7. The method of claim 1, further comprising receiving a beacon signal from the remote transmitting station.

8. The method of claim 7, further comprising receiving signal content and performing steps (f)-(g) using the previous calculated time offset as a starting point.

9. The method of claim 1, further comprising repeating steps (a)-(g) in a time period up to about 100 µs.

10. The method of claim 1, further comprising transmitting a signal with the at least two of the antenna sub-arrays and adjusting the relative transmit times of each sub-array with the time adjustments.

11. The method of claim 1, further comprising providing the sub-arrays on a vehicle's outer surface so that the remote transmitting station signal arrival time at a first sub-array is different from the remote transmitting station signal arrival time at a second sub-array.

12. A method of communicating between a remote receiving station and a transmit antenna having at least two sub-arrays, the method comprising:
   a. receiving a signal transmitted by the at least two of the antenna sub-arrays, so that the receiving station forms an output signal corresponding to the signal transmitted by each of the antenna sub-arrays;
   b. designating the signal received from one of the at least two sub-arrays as a reference output signal;
   c. forming a collection of composite output signals by combining the reference output signal with permutations of output signals from the other of the at least two sub-arrays and their output signals having an added time delay;
   d. selecting a composite output signal from the collection;
   e. calculating time offsets between the signals by comparing arrival times of the selected composite output signal with the at least two sub-array output signals;
   f. selecting the received signal with the highest time delay and adding a time adjustment to the output signals associated with other sub-arrays so that the output signals from each sub-array is synchronized; and
   g. combining the time adjusted output signals to create an output signal.

13. The method of claim 12, further comprising cross correlating the selected composite output signal with the at least two sub-array output signals to calculate the time offsets of step (e).

14. The method of claim 12, further comprising transponding the signal from the remote transmitting station through a satellite to the receive antenna.

15. A method of signal communications comprising:
   a. sending signals from at least two antenna sub-arrays of an antenna;
   b. designating the sent signal of one of the at least two sub-arrays as a reference sent signal;
   c. forming a collection of composite sent signals by combining the reference sent signal with permutations of sent signals from the other of the at least two sub-arrays and their sent signals having an added time delay;
   d. selecting a composite sent signal from the collection;
   e. calculating time offsets between the sent signals by cross correlating the selected composite output signal with the at least two sub-array output signals;
   f. synchronizing the sent signals based on the calculated time offsets; and g. combining the time adjusted output signals to create an output signal.

16. The method of claim 15, further comprising receiving the sent signals with a satellite and transponding the signals to another location.

17. The method of claim 15, wherein the composite signal selected in step (d) is the composite signal having a high power.

18. The method of claim 16, further comprising receiving a beacon signal from the satellite at the other location.

19. The method of claim 15, further comprising receiving signal content at the other location and performing steps (f)-(g) using the previous calculated time offset as a starting point.

20. A method of processing signals handled by an antenna having at least two sub-arrays, the method comprising:
   a. receiving output signals from at least two antenna sub-arrays of an antenna;
   b. designating the received signal of one of the at least two sub-arrays as a reference signal;
   c. forming a collection of composite signals by combining the reference sent signal with permutations of signals from the other of the at least two sub-arrays and their signals having an added time delay;
   d. selecting a composite signal from the collection;
   e. calculating time offsets between the signals by cross correlating the selected composite signal with the other received signals;
   f. synchronizing the received signals based on the calculated time offsets; and
   g. combining the time adjusted output signals to create a coherent signal.

21. The method of claim 20, further comprising receiving a signal from a satellite with the at least two sub-arrays and forming the output signals of step (a) from the at least two sub-arrays.

22. The method of claim 20, further comprising transmitting signals from the at least two sub-arrays to a satellite and transponding the signals from the satellite to form the output signals of step (a).

23. A method of processing signals handled by an antenna having at least two sub-arrays, the method comprising:
   a. receiving output signals from at least two antenna sub-arrays of an antenna;
   b. designating the received signal of one of the at least two sub-arrays as a reference signal;
   c. forming a collection of composite signals by combining the reference sent signal with permutations of signals from the other of the at least two sub-arrays and their signals having an added phase shift;
   d. selecting a composite signal from the collection;
   e. calculating time offsets between the signals by cross correlating the selected composite signal with the other received signals;
   f. synchronizing the received signals based on the calculated time offsets; and
   g. combining the time adjusted output signals to create a coherent signal.

* * * * *